(12) United States Patent
Jager et al.

(10) Patent No.: US 11,237,244 B2
(45) Date of Patent: Feb. 1, 2022

(54) MEASURING ANGLE OF ARRIVAL ON A CONSTANT AND/OR PRE-KNOWN PART OF A BLE PACKET

(71) Applicants: DENSO International America, Inc., Southfield, MI (US); DENSO CORPORATION, Kariya (JP)

(72) Inventors: Karl Jager, Holland, MI (US); Raymond Michael Stitt, Holland, MI (US)

(73) Assignees: DENSO International America, Inc., Southfield, MI (US); DENSO CORPORATION, Kariya (JP)

( * ) Notice: Subject to any disclaimer, the term of this patent is extended or adjusted under 35 U.S.C. 154(b) by 275 days.

(21) Appl. No.: 16/504,488

(22) Filed: Jul. 8, 2019

(65) Prior Publication Data

US 2020/0018818 A1    Jan. 16, 2020

Related U.S. Application Data

(60) Provisional application No. 62/697,650, filed on Jul. 13, 2018, provisional application No. 62/826,179, filed on Mar. 29, 2019.

(51) Int. Cl.
*G01S 5/10* (2006.01)
*G01S 5/02* (2010.01)
(Continued)

(52) U.S. Cl.
CPC ............... *G01S 5/10* (2013.01); *G01S 3/043* (2013.01); *G01S 3/465* (2013.01); *G01S 3/48* (2013.01); *G01S 5/0236* (2013.01); *H04W 4/80* (2018.02)

(58) Field of Classification Search
CPC .......... G01S 5/10; G01S 5/0236; G01S 3/043; G01S 3/465; G01S 3/48
(Continued)

(56) References Cited

U.S. PATENT DOCUMENTS 9,688,247 B1    6/2017 Jayaraman et al.
9,894,492 B1    2/2018 Elangovan et al.
(Continued)

FOREIGN PATENT DOCUMENTS

BR    10201401746    2/2016
CN    10457459    4/2015
(Continued)

*Primary Examiner* — Bo Fan
(74) *Attorney, Agent, or Firm* — Harness, Dickey & Pierce, P.L.C.

(57) ABSTRACT

A system and method are disclosed and include receiving a wireless signal. The method includes generating a first and second set of digital data that are representative of the wireless signal. The method includes obtaining a first and second sample that is representative of a cosine and sine component, respectively, of a pre-known portion of the first set. The method includes obtaining a third and fourth sample that is representative of a cosine and sine component, respectively, of a pre-known portion of the second set. The method includes determining a first phase angle value based on an amplitude of the first and second samples and a second phase angle based on an amplitude of the third and fourth samples. The method includes determining an angle of arrival based on a difference between the first and second phase angle values.

22 Claims, 10 Drawing Sheets

(51) Int. Cl.
*G01S 3/48* (2006.01)
*G01S 3/46* (2006.01)
*G01S 3/04* (2006.01)
*H04W 4/80* (2018.01)

(58) Field of Classification Search
USPC .................................... 342/377, 109, 158
See application file for complete search history.

(56) References Cited

U.S. PATENT DOCUMENTS

| | | | |
|---|---|---|---|
| 10,002,479 | B2 | 6/2018 | Oz et al. |
| 2011/0215921 | A1 | 9/2011 | Ben Ayed et al. |
| 2012/0045058 | A1 | 2/2012 | Weghaus |
| 2014/0274013 | A1 | 9/2014 | Santavicca |
| 2015/0148989 | A1 | 5/2015 | Cooper et al. |
| 2015/0161832 | A1 | 6/2015 | Esselink et al. |
| 2015/0310681 | A1 | 10/2015 | Avery et al. |
| 2015/0356797 | A1 | 12/2015 | McBride et al. |
| 2016/0150407 | A1 | 5/2016 | Michaud et al. |
| 2017/0062938 | A1* | 3/2017 | Cheng .................. H01Q 9/42 |
| 2017/0104589 | A1 | 4/2017 | Lambert et al. |
| 2017/0132533 | A1 | 5/2017 | Darnell et al. |
| 2017/0309098 | A1 | 10/2017 | Watters et al. |
| 2017/0330402 | A1 | 11/2017 | Menard et al. |
| 2018/0029560 | A1 | 2/2018 | Mohaupt et al. |
| 2018/0099643 | A1* | 4/2018 | Golsch .............. G07C 9/00309 |
| 2018/0103414 | A1 | 4/2018 | Golsch |
| 2018/0126952 | A1 | 5/2018 | Niemiec |
| 2018/0154865 | A1 | 6/2018 | Bianchi, III et al. |
| 2018/0269565 | A1 | 9/2018 | Guthrie et al. |

FOREIGN PATENT DOCUMENTS

| | | |
|---|---|---|
| JP | 2003043094 A | 2/2003 |
| JP | 2004239745 A | 8/2004 |
| JP | 2015200516 A | 11/2015 |
| JP | 2017046025 A | 3/2017 |
| WO | WO-16156682 A1 | 10/2016 |
| WO | WO-2017181050 A1 | 10/2017 |
| WO | WO-18040641 A1 | 3/2018 |

* cited by examiner

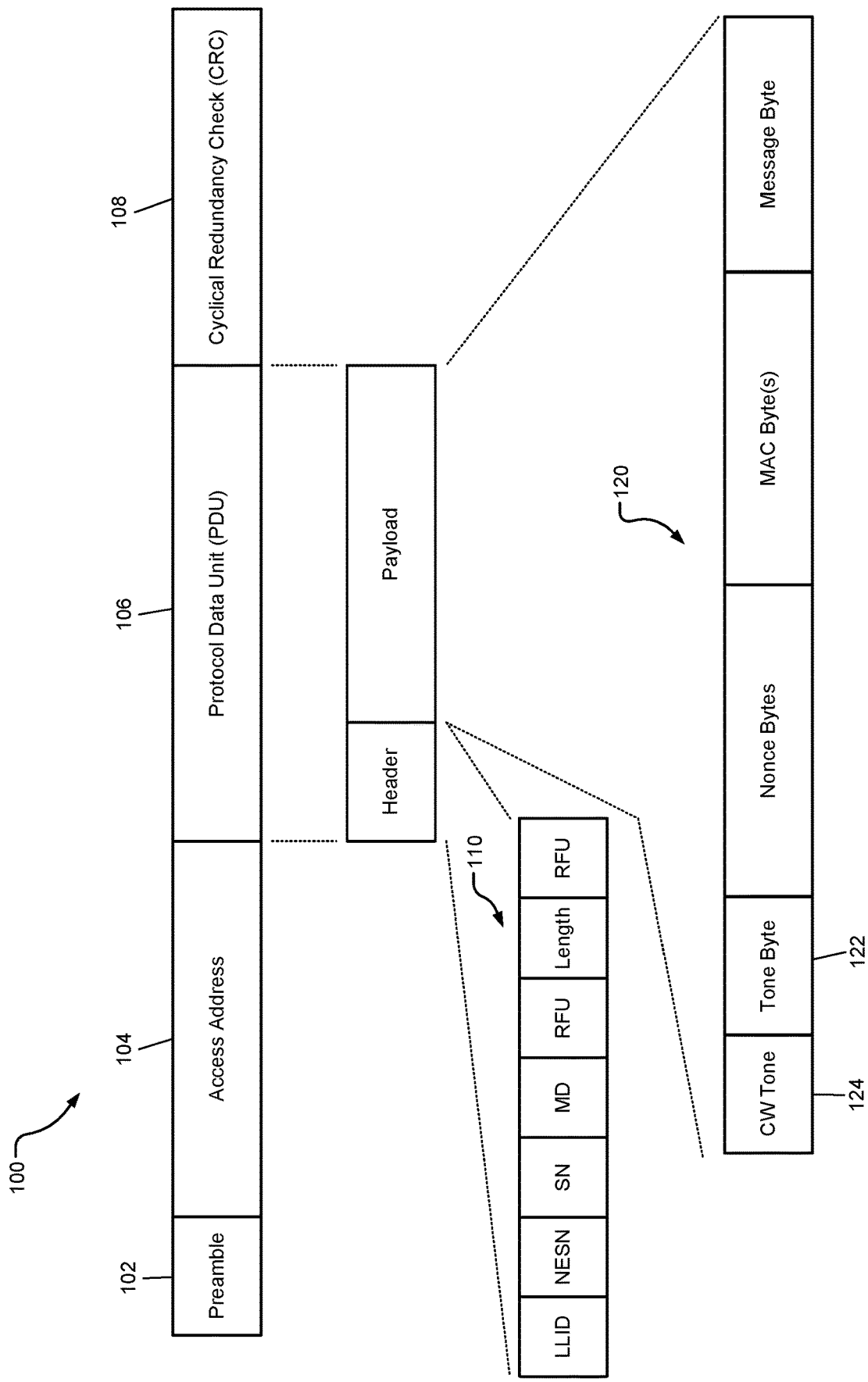

MEASURING ANGLE OF ARRIVAL ON A CONSTANT AND/OR PRE-KNOWN PART OF A BLE PACKET

CROSS-REFERENCE TO RELATED APPLICATIONS

This application claims the benefit of U.S. Provisional Application No. 62/697,650, filed on Jul. 13, 2018 and U.S. Provisional Application No. 62/826,179, filed Mar. 29, 2019. The entire disclosure of the above application is incorporated herein by reference.

FIELD

The present disclosure relates to systems and methods for measuring angle of arrival on a constant part of a Bluetooth low energy (BLE) packet.

BACKGROUND

This section provides background information related to the present disclosure and is not necessarily prior art.

Traditionally, a passive entry/passive start (PEPS) system, which is a vehicle system that includes a keyless entry system, allows anyone in possession of a key fob that has been previously paired with a vehicle's central PEPS electronic control unit (ECU) to access the vehicle by simply grabbing the door handle and to start the vehicle with a push of a button. In response to a button push, the central PEPS ECU authenticates the key fob to determine if the key fob is authorized to access the vehicle and uses the signal strength indicated by a plurality of vehicle antennas to estimate the location of the key fob. If the key fob is authenticated and is located within an authorizing zone, the vehicle's function is made available to the user (e.g., doors are unlocked or vehicle is started).

Traditionally, PEPS systems use proprietary grade radio protocols using low frequency (LF) signals of approximately 125 kHz. PEPS systems are also hampered by the physics of the LF systems. LF was selected by early PEPS systems because the wave propagation allows for relatively accurate estimation of range and location by using signal strength within the typical target activation range of 2 meters. However, due to the extremely long wavelength of the LF signal compared to the size of a practical vehicle antenna and key fob receiver, it is difficult within reasonable power consumption and safe transmit power levels to reliably communicate with a key fob using LF beyond a few meters. Consequently, it is difficult to make any of the vehicle's functions available to the user when the key fob is located more than a few meters away from the vehicle.

Accordingly, key fobs are being implemented by smart devices, such as smartphones and wearable devices, wherein the smart devices are able to communicate at a range greater than the activation range of LF systems. As such, smart devices enable the availability of various vehicle functions and long-range distancing features, such as passive welcome lighting, distance bounding on remote parking applications, and so on.

In order to estimate the range and location of the smart devices, the PEPS systems may be configured to measure an angle of arrival on signals transmitted by the smart device.

SUMMARY

This section provides a general summary of the disclosure, and this section is not a comprehensive disclosure of its full scope or all of its features.

A method is provided and includes: receiving, using antennas, a wireless signal comprising a packet, where the packet includes data with a pre-known portion; generating, using transceiver and a microcontroller, (i) a first set of digital data that is representative of the pre-known portion received using a first antenna of the antennas, and (ii) a second set of digital data that is representative of the pre-known portion received using a second antenna of the antennas; obtaining, using the microcontroller, (i) a first sample that is representative of a cosine component of the pre-known portion of the first set of digital data, and (ii) a second sample that is representative of a sine component of the pre-known portion of the first set of digital data; obtaining, using the microcontroller, (i) a third sample that is representative of a cosine component of the pre-known portion of the second set of digital data, and (ii) a fourth sample that is representative of a sine component of the pre-known portion of the second set of digital data; determining, using a processor of the microcontroller, (i) a first phase angle value associated with the first antenna based on an amplitude of the first sample and an amplitude of the second sample, and (ii) a second phase angle value associated with the second antenna based on an amplitude of the third sample and an amplitude of the fourth sample, where the processor is configured to execute instructions stored in a non-transitory computer-readable memory; and determining, using the processor, an angle of arrival based on a difference between the first phase angle value and the second phase angle value.

In other features, a system is provided and includes: antennas configured to receive a wireless signal including a packet, where the packet includes data with a pre-known portion, a transceiver and a microcontroller. At least one of the transceiver and the microcontroller is configured to generate (i) a first set of digital data that is representative of the pre-known portion received using a first antenna of the plurality of antennas, and (ii) a second set of digital data that is representative of the pre-known portion received using a second antenna of the plurality of antennas The microcontroller is configured to: obtain (i) a first sample that is representative of a cosine component of a pre-known portion of the first set of digital data, and (ii) a second sample that is representative of a sine component of the pre-known portion of the first set of digital data; and obtain (i) a third sample that is representative of a cosine component of a pre-known portion of the second set of digital data, and (ii) a fourth sample that is representative of a sine component of the pre-known portion of the second set of digital data. The microcontroller includes a processor configured to execute instructions stored in a non-transitory computer-readable memory, and wherein the instructions include: determining (i) a first phase angle value associated with the first antenna based on an amplitude of the first sample and an amplitude of the second sample, and (ii) a second phase angle value associated with the second antenna based on an amplitude of the third sample and an amplitude of the fourth sample; and determining an angle of arrival based on a difference between the first phase angle value and the second phase angle value.

A method is also disclosed and includes receiving, using a plurality of antennas, a wireless signal. The method also includes generating, using a microcontroller, (i) a first set of digital data that is representative of the wireless signal received using a first antenna of the plurality of antennas, and (ii) a second set of digital data that is representative of the wireless signal received using a second antenna of the plurality of antennas. The method also includes obtaining, using the microcontroller, (i) a first sample that is representative of a cosine component of a constant portion of the first set of digital data, and (ii) a second sample that is representative of a sine component of the constant portion of the first set of digital data. The method also includes obtaining, using the microcontroller, (i) a third sample that is representative of a cosine component of a constant portion of the second set of digital data, and (ii) a fourth sample that is representative of a sine component of the constant portion of the second set of digital data. The method also includes determining, using a processor of the microcontroller, (i) a first phase angle value associated with the first antenna based on an amplitude of the first sample and an amplitude of the second sample, and (ii) a second phase angle value associated with the second antenna based on an amplitude of the third sample and an amplitude of the fourth sample, wherein the processor is configured to execute instructions stored in a non-transitory computer-readable memory. The method also includes determining, using the processor, an angle of arrival based on a difference between the first phase angle value and the second phase angle value.

In some embodiments, the wireless signal is a Bluetooth signal.

In some embodiments, the constant portion of the first set of digital data is an access address portion of the Bluetooth signal, and the constant portion of the second set of digital data is the access address portion of the Bluetooth signal.

In some embodiments, the constant portion of the first set of digital data is one of a preamble portion and a cyclical redundancy check portion of the Bluetooth signal, and the constant portion of the second set of digital data is one of the preamble portion and the cyclical redundancy check portion of the Bluetooth signal.

In some embodiments, the Bluetooth signal includes a preamble portion, an access address portion, a protocol data unit portion, and a cyclical redundancy check portion.

In some embodiments, the Bluetooth signal includes a constant waveform (CW) tone section.

In some embodiments, the method further comprises obtaining the first sample, the second sample, the third sample, and the fourth sample using an IQ generator of the microcontroller.

In some embodiments, the method further comprises coupling, using a switching circuit, the first antenna to the microcontroller. The method also comprises. in response to a sampling period elapsing: decoupling, using the switching circuit, the first antenna from the microcontroller; and coupling, using the switching circuit, the second antenna to the microcontroller.

In some embodiments, determining the first phase angle value further comprises executing, using the processor, an arctangent function based on the amplitude of the first sample and the amplitude of the second sample.

In some embodiments, determining the second phase angle value further comprises executing, using the processor, an arctangent function based on the amplitude of the third sample and the amplitude of the fourth sample.

A system is also disclosed and includes a plurality of antennas configured to receive a wireless signal, and a microcontroller configured to: generate (i) a first set of digital data that is representative of the wireless signal received using a first antenna of the plurality of antennas, and (ii) a second set of digital data that is representative of the wireless signal received using a second antenna of the plurality of antennas. The microcontroller is also configured to obtain (i) a first sample that is representative of a cosine component of a constant portion of the first set of digital data, and (ii) a second sample that is representative of a sine component of the constant portion of the first set of digital data. The microcontroller is also configured to obtain (i) a third sample that is representative of a cosine component of a constant portion of the second set of digital data, and (ii) a fourth sample that is representative of a sine component of the constant portion of the second set of digital data. The microcontroller also includes a processor configured to execute instructions stored in a non-transitory computer-readable memory, and wherein the instructions include determining (i) a first phase angle value associated with the first antenna based on an amplitude of the first sample and an amplitude of the second sample, and (ii) a second phase angle value associated with the second antenna based on an amplitude of the third sample and an amplitude of the fourth sample. The instructions also include determining an angle of arrival based on a difference between the first phase angle value and the second phase angle value.

In some embodiments, the wireless signal is a Bluetooth signal.

In some embodiments, the constant portion of the first set of digital data is an access address portion of the Bluetooth signal, and the constant portion of the second set of digital data is the access address portion of the Bluetooth signal.

In some embodiments, the constant portion of the first set of digital data is one of a preamble portion and a cyclical redundancy check portion of the Bluetooth signal, and the constant portion of the second set of digital data is one of the preamble portion and the cyclical redundancy check portion of the Bluetooth signal.

In some embodiments, the Bluetooth signal includes a preamble portion, an access address portion, a protocol data unit portion, and a cyclical redundancy check portion.

In some embodiments, the Bluetooth signal includes a constant waveform (CW) tone section or tone byte(s).

In some embodiments, the system further comprises an IQ generator of the microcontroller, wherein the IQ generator is configured to obtain the first sample, the second sample, the third sample, and the fourth sample.

In some embodiments, the system further comprises a switching circuit configured to couple the first antenna to the microcontroller. The switching circuit is also configured to, in response to a sampling period elapsing: decouple the first antenna from the microcontroller; and couple the second antenna to the microcontroller.

In some embodiments, the processor is configured to determine the first phase angle value by executing an arctangent function based on the amplitude of the first sample and the amplitude of the second sample.

In some embodiments, the processor is configured to determine the first phase angle value by executing an arctangent function based on the amplitude of the third sample and the amplitude of the fourth sample.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and the drawings are not intended to limit the scope of the present disclosure.

FIGS. 7A-7B illustrate example message packets according to the present disclosure.

Corresponding reference numerals indicate corresponding parts throughout the several views of the drawings.

DETAILED DESCRIPTION

Example embodiments will now be described more fully with reference to the accompanying drawings.

The present disclosure relates to systems, methods, and architecture to implement a localization system, such as a PEPS system, using a consumer grade wireless protocol. Specifically, the present disclosure relates to a PEPS system using a wireless communication protocol, such as a Bluetooth Low Energy (BLE) communication protocol, for communication between the vehicle and a portable device, such as a smartphone or a wearable device. The PEPS system includes a sensor network that is configured to find existing connections between the portable device and the vehicle and to measure the timing and signal characteristics of the communication between the portable device and the vehicle. Based on the timing and signal characteristics, the PEPS system may determine an angle of arrival between the portable device and the vehicle.

Figure 1:
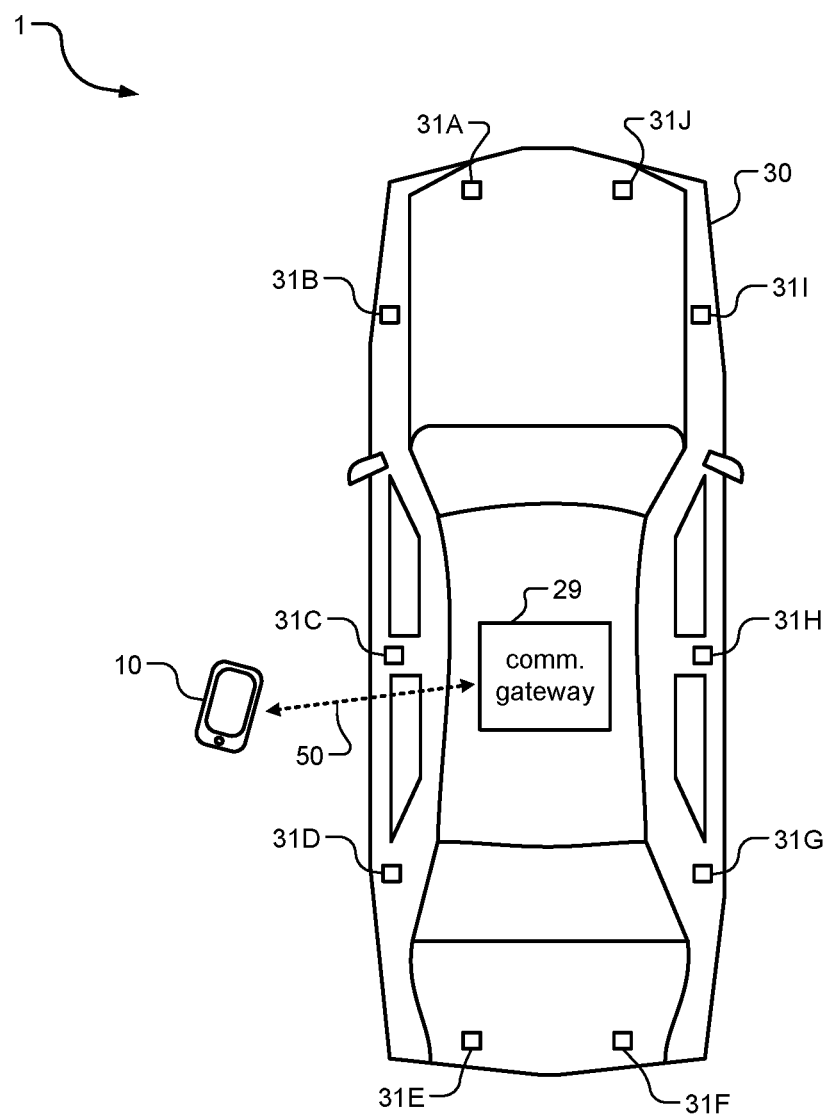
FIG. 1 is an illustration of a vehicle and a portable device according to the present disclosure.
Figure 2:
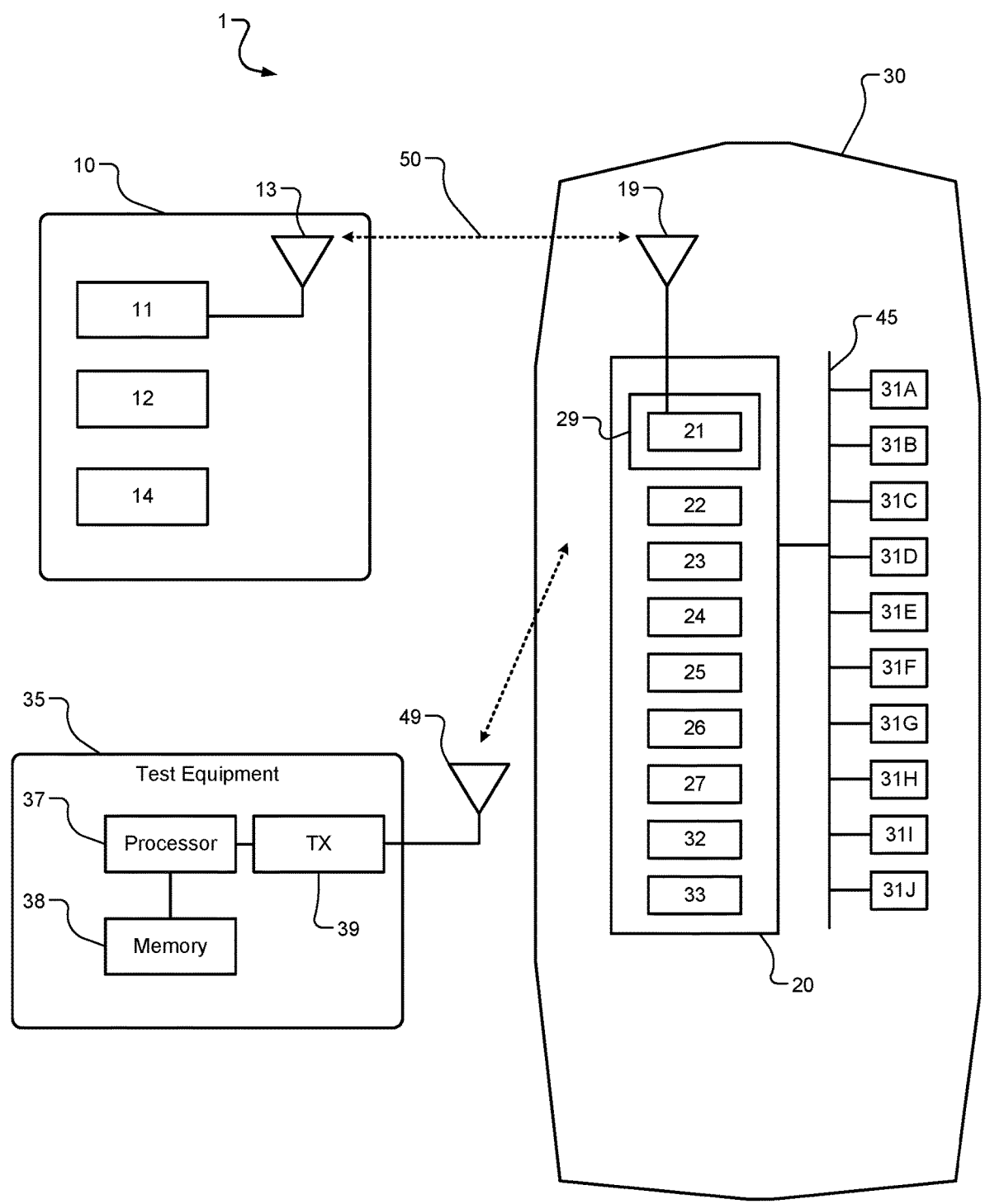
FIG. 2 is a functional block diagram of a vehicle and a portable device according to the present disclosure.

With reference to FIGS. 1-2, a PEPS system 1 is provided within a vehicle 30 and includes a communication gateway 29, sensors 31A-31J (collectively referred to as sensors 31), and a control module 20. The communication gateway 29 may be configured or programmed to measure or exchange RSSIs, angle-of-departure-transmission values, angle-of-arrival-reception values, round trip time of flight values, and/or carrier phase based ranging information. While FIGS. 1-2 illustrate ten sensors 31A-31J, any number of sensors may be used. Each of the sensors 31 may be configured or programmed to measure or exchange RSSIs, angle-of-departure-reception values, angle-of-arrival-transmission values, round trip time of flight values, and/or carrier phase based ranging information. Furthermore, while FIG. 2 illustrates one control module 20, the PEPS system 1 may include one or more control modules 20 that are distributed throughout the vehicle 30.

The one or more control modules 20 and the sensors 31 may communicate with each other using a vehicle interface 45. As an example, the vehicle interface 45 may include a controller area network (CAN) bus for communication between main modules. As another example, the vehicle interface 45 may include a local interconnect network (LIN) for lower data-rate communication. In other embodiments, the vehicle interface 45 may include a clock extension peripheral interface (CXPI) bus. Additionally or alternatively, the vehicle interface 45 may include any combination of the CAN bus, LIN, CXPI, radio frequency, and electronic bus communication interfaces.

The control module 20 includes the communication gateway 29, which includes a wireless communication chipset (or transceiver) 21 connected to one or more antennas 19. For example, the wireless communication chipset 21 may be a Bluetooth low energy (BLE) communication chipset that utilizes the BLE communication protocol. Alternatively, other wireless communication protocols, such as Wi-Fi or Wi-Fi directed, may be used. As shown in FIG. 2, the antennas 19 may be located in the vehicle 30. Alternatively, the antennas 19 may be located outside of the vehicle 30 or within the control module 20. The control module 20 may also include a link authentication module 22 that authenticates a portable device 10 for communication via communication link 50. As an example, the link authentication module 22 may be configured to execute challenge-response authentication or other cryptographic verification algorithms in order to authenticate the portable device 10.

Test equipment 35 may be included for performing at least some of the calibration operations as described below. The test equipment 35 may be implemented as, for example, a computer or a test stand and have a processor 37, memory 38, a transceiver 39 and an antenna 49 for communicating with the control module 20. The memory 38 may store calibration software and/or calibration information described herein.

The control module 20 may also include a data management layer 23 for push data. As an example, the data management layer 23 is configured obtain vehicle information obtained by any of the modules (e.g., location information obtained by a telematics module 26) and transmit the vehicle information to the portable device 10.

The control module 20 may also include a connection information distribution module 24 that is configured to obtain information corresponding to the communication channels and channel switching parameters of the communication link 50 and transmit the information to the sensors 31. In response to the sensors 31 receiving the information from the connection information distribution module 24 via the vehicle interface 45 and the sensors 31 being synchronized with the communication gateway 29, the sensors 31 may locate and follow, or eavesdrop on, the communication link 50.

The control module 20 may also include a timing control module 25, which obtains timing information corresponding to the communication link 50 when the link authentication module 22 executes challenge-response authentication. Furthermore, the timing control module 25 is configured to provide the timing information to the sensors 31 via the vehicle interface 45.

The control module 20 may also include the telematics module 26, which is configured to generate location information and/or error of location information associated with the vehicle 30. The telematics module 26 may be implemented by a global navigation satellite system (e.g., GPS), inertial navigation system, global system for mobile communication (GSM) system, or other location system.

The control module 20 may also include a security filtering module 33 that is configured to detect violations of the physical layer and protocol and filter the data accordingly before providing the information to a sensor processing and localization module 32. The security filtering module 33 may also be configured to flag data as injected so that the sensor processing and localization module 32 may discard the flagged data and alert the PEPS system 1. The data from the sensor processing and localization module 32 is provided to a PEPS module 27, which is configured to read vehicle state information from the sensors 31 in order to detect user intent to access a vehicle function and to compare the location of the portable device 10 to the set of locations that authorize certain functions, such as unlocking a door of the vehicle 30 and/or starting the vehicle 30.

In order to carry out the above functionality of the various modules described above, the control module 20 may also include one or more processors that are configured to execute instructions stored in a non-transitory computer-readable medium, such as a read-only memory (ROM) and/or random access memory (RAM).

As shown in FIGS. 1-2, the portable device 10 may communicate with the communication gateway 29 of the vehicle 30 via the communication link 50. Without limitation, the portable device 10 may be, for example, any Bluetooth-enabled communication device, such as a smartphone, smart watch, wearable electronic device, key fob, tablet device, Bluetooth transmitter device, or other device associated with a user of the vehicle 30, such as an owner, driver, passenger of the vehicle 30, and/or a technician for the vehicle 30. Additionally or alternatively, the portable device 10 may be configured for wireless communication via another wireless communication protocol, such as Wi-Fi and/or Wi-Fi direct. The communication link 50 may be a Bluetooth communication link as provided for and defined by the Bluetooth specification. As an example, the communication link 50 may be a BLE communication link. Alternatively, the communication link 50 may be a Wi-Fi or Wi-Fi direct communication link.

The portable device 10 may include a wireless communication chipset 11 connected to an antenna 13. The wireless communication chipset 11 may be a BLE communication chipset. Alternatively, the wireless communication chipset 11 may be a Wi-Fi or Wi-Fi direct communication chipset. The portable device 10 may also include application code 12 that is executable by the processor of the portable device 10 and stored in a non-transitory computer-readable medium, such as a read-only memory (ROM) or a random-access memory (RAM). Based on the application code 12 and using the wireless communication chipset 11 and the antenna 13, the portable device 10 may be configured to execute various instructions corresponding to, for example, authentication of the communication link 50, transmission of location and/or velocity information obtained by a global navigation satellite system (e.g., GPS) sensor or accelerometer of the portable device 10, and manual activation of a vehicle function.

The portable device 10 may also include a cryptographic verification module (CVM) 14, which may be implemented by application code that is executable by the processor of the portable device 10 and stored in a non-transitory computer-readable medium, such as a read-only memory (ROM) or a random-access memory (RAM). The CVM 14 may be configured to generate and insert a tone byte (shown below) into a message packet in order to prevent the communication link 50 from being subjected to replay attacks. Example algorithms for generating the tone byte are described in detail in U.S. patent application Ser. No. 16/211,330, filed on Dec. 6, 2018, and assigned to DENSO International America, Inc., which is incorporated herein by reference in its entirety.

Figure 3:
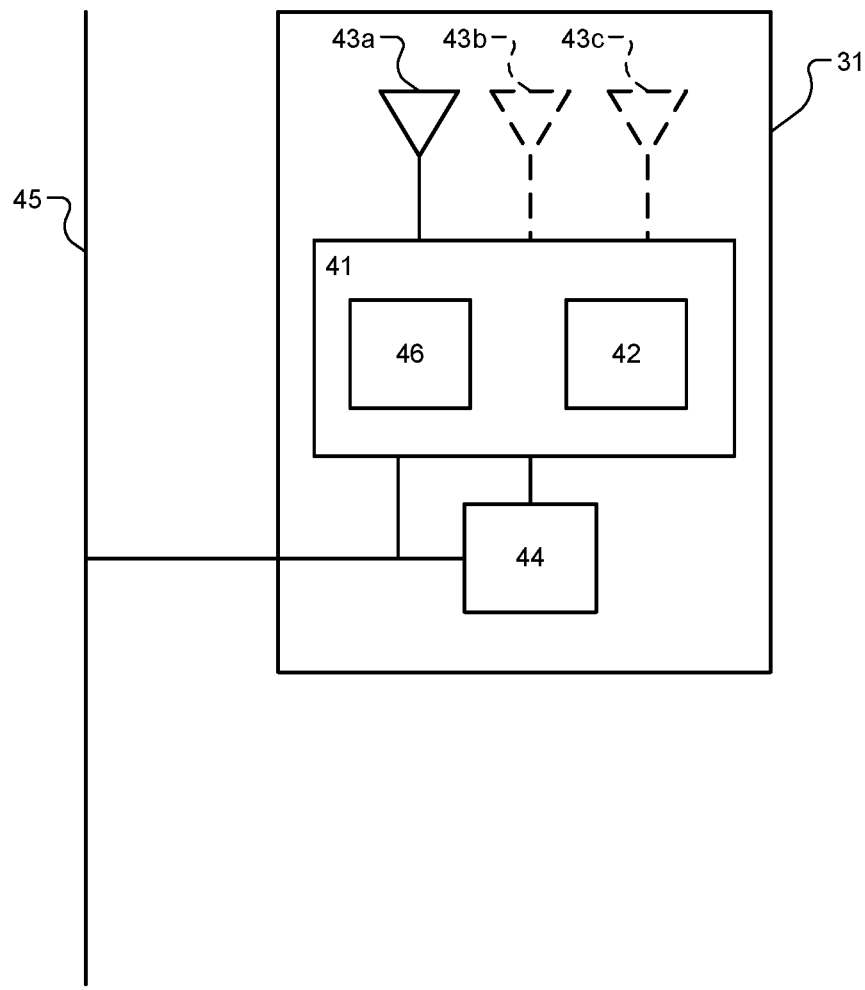
FIG. 3 is a functional block diagram of a sensor of a vehicle according to the present disclosure.

With reference to FIG. 3, each of the sensors 31 includes a wireless communication chipset 41 connected to an antenna (or antenna assembly) 43, which may include multiple antenna elements. Any number of antennas 43 may be included in each of the sensors 31. In FIG. 3, three antennas 43a, 43b, and 43c are shown. The wireless communication chipset 41 may be a BLE communication chipset. Alternatively, the wireless communication chipset 41 may be a Wi-Fi or Wi-Fi direct communication chipset. As shown in FIG. 3, the antennas 43 may be located internal to the sensors 31. Alternatively, the antennas 43 may be located external to the sensors 31. The antennas 43 are described below in further detail with reference to FIGS. 5-6.

The control module 20 and, more specifically, the communication gateway 29, can establish a secure communication connection, such as communication link 50, with the portable device 10. For example, the control module 20 can establish a secure communication connection using the BLE communication protocol. The control module 20 can then communicate information about the secure communication connection, such as timing and synchronization information, to each of the sensors 31. For example, the control module 20 can communicate information about the secure communication connection, such as the timing of the next communication connection event, the timing interval between communication connection events, the communication channel for the next communication connection event, a channel map, a channel hop interval or offset to calculate the channel for subsequent communication connection events, communication latency information, communication jitter information, etc. The sensors 31 can then eavesdrop on communication packets sent by the portable device to the control module 20 and can measure signal information of the signals received from the portable device 10. For example, the sensors 31 can measure the received signal strength and determine a received signal strength indicator (RSSI) value. Additionally or alternatively, the sensors 31 can determine other measurements of the signals received from the portable device 10, such as an angle of arrival, a time of arrival, a time difference of arrival, angle of departure, a time difference of arrival, round trip time of flight distance, carrier phase based-ranging distance, etc.

The sensors 31 can then communicate the measured information to the control module 20, which can then determine a location of the portable device 10 or a distance to the portable device 10 based on the measured information received from each of the sensors 31. For example, the control module 20 can determine the location of the portable device 10 based on, for example, the patterns of the RSSI values for the various signals received from the portable device 10 by the various sensors 31. For example, a relatively strong RSSI generally indicates that the portable device 10 is closer and a relatively weak RSSI generally indicates that the portable device 10 is farther away. By analyzing the RSSI for communication signals sent by the portable device 10 with each of the sensors 31, the control module 20 can determine a location of or distance to the portable device 10 relative to the vehicle 30. Additionally or alternatively, angle of arrival or time difference of arrival measurements for the signals sent by the portable device 10 and received by the sensors 31 can also be used by the control module 20 to determine the location of the portable device 10. Additionally or alternatively, the sensors 31 themselves can determine a location of the portable device 10 or distance to the portable device 10 based on the measured information and can communicate the location or distance to the control module 20.

Based on the determined location or distance of the portable device 10 relative to the vehicle 30, the PEPS system 1 can then authorize or perform a vehicle function, such as unlocking a door of the vehicle 30, unlocking a trunk of the vehicle 30, starting the vehicle 30, and/or allowing the vehicle 30 to be started. For example, if the portable device 10 is less than a first distance threshold to the vehicle 30, the PEPS system 1 can activate interior or exterior lights of the vehicle 30. If the portable device 10 is less than a second distance threshold to the vehicle, the PEPS system 1 can unlock doors or a trunk of the vehicle 30. If the portable device 10 is located inside of the vehicle 30, the PEPS system 1 can allow the vehicle 30 to be started.

With continued reference to FIG. 3, when the BLE communication protocol is used, the sensors 31 receive BLE signals using the antennas 43 and, specifically, receive BLE physical layer messages using a BLE physical layer (PHY) controller 46. The sensors 31 can be configured to observe BLE physical layer messages and obtain measurements of the physical properties of the associated signals, including, for example, the received signal strength indication (RSSI) using a channel map that is produced by a channel map reconstruction module 42. Additionally or alternatively, the sensors 31 may communicate with each other and/or communicate with the communication gateway 29 via the vehicle interface 45 to determine time difference of arrival, time of arrival, or angle of arrival data for signals received by multiple sensors 31.

A timing synchronization module 44 is configured to accurately measure the reception times of messages on the vehicle interface 45 and pass the timing information to the wireless communication chipset 41. The wireless communication chipset 41 is configured to tune the PHY controller 46 to a specific channel at a specific time based on the channel map information and the timing signals. Furthermore, when the BLE communication protocol is used, the wireless communication chipset 41 is configured to observe all physical layer messages and data that conform to the Bluetooth physical layer specification, which includes the normal data rates proposed or adopted in, for example, the Bluetooth Specification version 5.0. The data, timestamps, and measured signal strength may be reported by the wireless communication chipset 41 to the various modules of the control module 20 via the vehicle interface 45.

Figure 4:
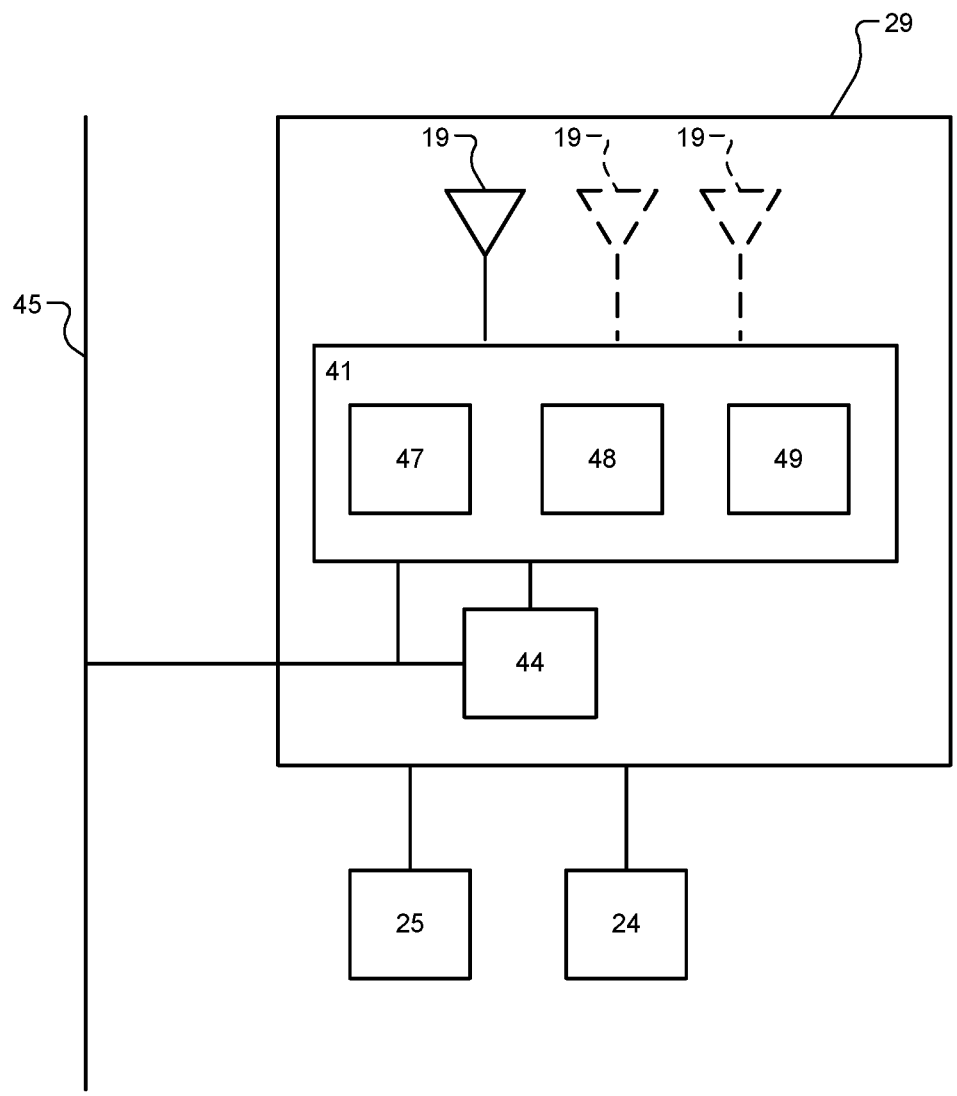
FIG. 4 is a functional block diagram of a communication gateway of a vehicle according to the present disclosure.

With reference to FIG. 4, the communication gateway 29 includes the wireless communication chipset 41 connected to the one or more antennas 19 (e.g., antennas 19A, 19B and 19C are shown) to receive BLE signals. When the BLE communication protocol is used, the wireless communication chipset 41 implements a Bluetooth protocol stack 48 that is, for example, compliant with the BLE specification. The wireless communication chipset 41 may also include an application 47 implemented by application code that is executable by a processor of the wireless communication chipset 41. Additionally or alternatively, the application 47 may be executable by a processor of the control module 20 and may be stored in a non-transitory computer-readable medium of the control module 20.

The application 47 may include code corresponding to modifications outside of the Bluetooth specification to enable the wireless communication chipset 41 to inspect timestamped data transmitted and received by the wireless communication chipset 41, regardless of the validity of the data. For example, the application 47 enables the wireless communication chipset 41 to compare transmitted and received data against expectations. The communication gateway 29 is configured to transmit the actual transmitted and received data to the various modules of the control module 20 via the vehicle interface 45. Alternatively, the communication gateway 29 may be configured to receive the data from each of the sensors 31 via the vehicle interface 45. The application 47 may be further configured to enable the wireless communication chipset 41 to confirm that each of the sensors 31 has received the correct data at the correct time.

The Bluetooth protocol stack 48 is configured to provide the channel map, access identifier, next channel, and the time to the next channel to the application 47. The Bluetooth protocol stack 48 is configured to output timing signals for the timestamps of transmission and reception events to the application 47 and/or a digital PIN output of the wireless communication chipset 41. The communication gateway 29 also includes the timing synchronization module 44, which is configured to accept the timing signals and works in conjunction with the vehicle interface 45 to create accurate time stamps of connection information messages and other communications.

With continued reference to FIG. 4, the communication gateway 29 may provide timing information and channel map information to the timing control module 25 and, respectively. The communication gateway 29 may be configured to provide information corresponding to ongoing connections to the connection information distribution module 24 and timing signals to the timing control modules 25 so that the sensors 31 can find and follow, or eavesdrop on, the communication link 50.

Additionally, the wireless communication chipset 41 includes a phone-as-a-key (PaaK) module 49, which is implemented by application code that is executable by the processor of the control module 20 and stored in a non-transitory computer-readable medium, such as a read-only memory (ROM) or a random-access memory (RAM). The PaaK module 49 is configured to remove the tone byte (shown below) from the message packet and reconstruct the message packet. Example algorithms for removing the tone byte and reconstructing the message packet are described in U.S. patent application Ser. No. 16/211,330, filed on Dec. 6, 2018, and assigned to DENSO International America, Inc., which is incorporated herein by reference in its entirety.

Figure 5A:
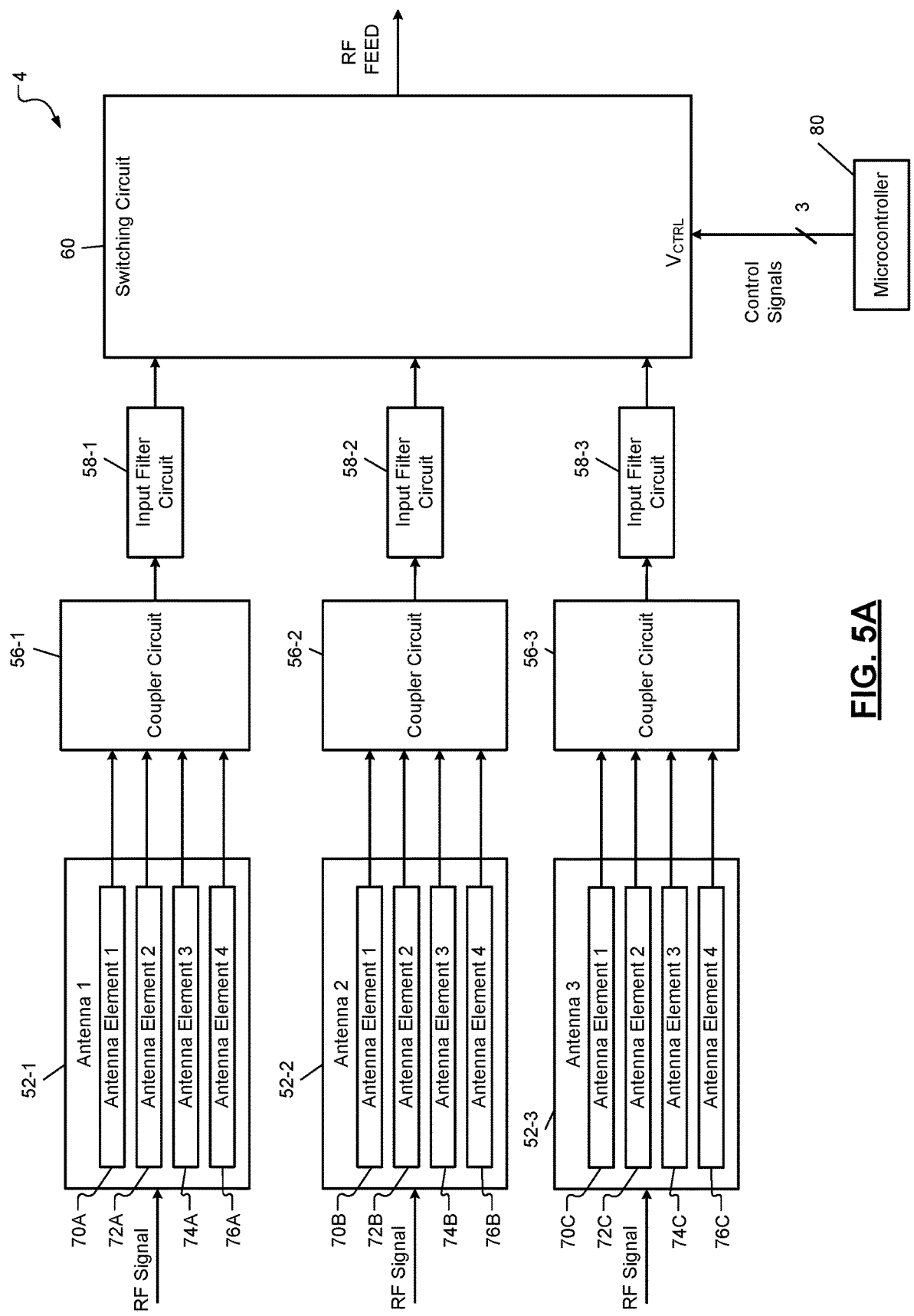
FIGS. 5A and 5B illustrate an example antenna transceiver system including a system on chip (SoC) receiver and a microcontroller according to the present disclosure.
Figure 5B:
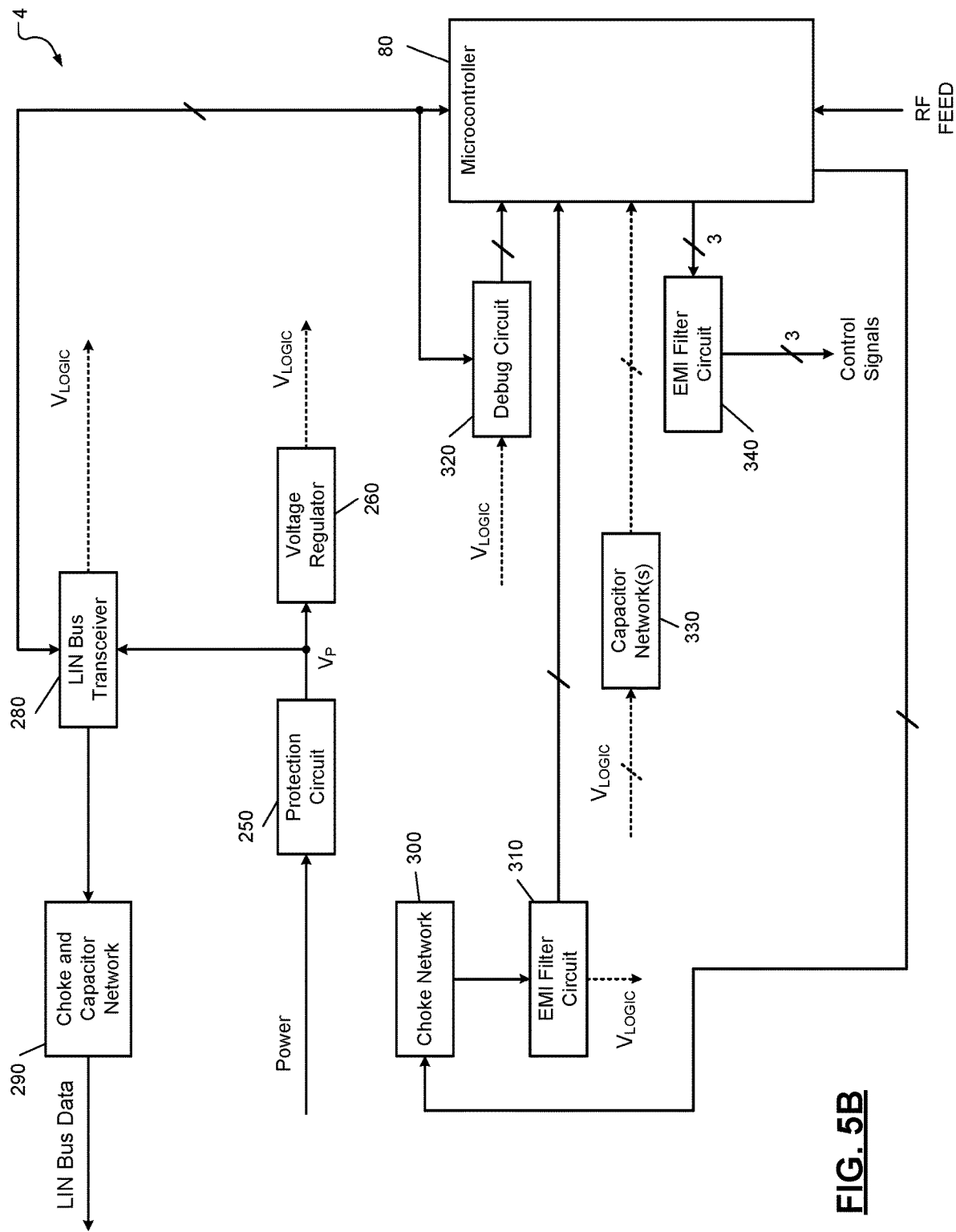

FIGS. 5A and 5B (collectively FIG. 5) show an example electronics system 4 configured to determine an angle of arrival of the communication link 50 of FIG. 2. The electronics system 4 may include, for example, the antennas 43 and/or antennas 52-1, 52-2, 52-3 (collectively referred to as antennas 52), coupler circuits 56-1, 56-2, 56-3 (collectively referred to as coupler circuits 56), input filter circuits 58-1, 58-2, 58-3 (collectively referred to as input filter circuits 58), and a switching circuit 60. In one embodiment, the coupler circuits 56, the input filter circuits 58, and the switching circuit 60 may be disposed on a printed circuit board (PCB).

Each of the antennas 52 is configured to receive, at various phases (0°, 90°, 180°, and 270°, or 0°, −90°, −180°, and −270°), the RF signal transmitted by the portable device 10. In one example embodiment, the antennas 52 are implemented by quadrifiliar antennas. The antennas 52 may be electrically coupled to either a ground 54 or the coupler circuits 56, and the coupler circuits 56 may be implemented by a 3 dB 90° hybrid coupler. Each of the coupler circuits 56 are configured to combine the RF signals received from the respective antennas 52 and output a signal that has a phase difference of, for example, 90°. Reflections from signal mismatches may be provided to a ground via an isolation port of the coupler circuits 56.

The antenna elements of each of the antennas respectively receive signals at the different phases. As an example, antenna elements 70A, 72A, 74A, 76A may receive a RF signal at respective phases 0°, −90°, −180°, and −270°. This system 4 may include one or more (n) antenna elements per antenna and the coupler circuits 56 have phase inputs at steps of 360°/n. The sign of phase and the definition of positive and negative phase and the right versus left handedness may be such that the antennas 43, 52 have greater gain towards the top surfaces of the antennas and smaller gain towards the bottom surfaces of the antennas.

In one embodiment, pairs of the antenna elements are connected to respective baluns and/or other impedance matching circuit elements, where each balun has two outputs; one output connected to the ground plane and the other output connected to a corresponding one of the coupler circuits 56. Thus, each of the antennas 43, 52 may be connected to two baluns, where the two baluns have two outputs that are connected to the same coupler circuit. The coupler circuits 56, which may be implemented by a 3 dB 90° hybrid coupler. The coupler circuits 56 may include hybrid devices, such as hybrid couplers and/or hybrid splitters/combiners, such as quadrature (90-degree) and 180-degree hybrids in coaxial connectorized and surface-mount packages. In one embodiment, the coupler circuits 56 include respective impedance matching circuits.

Each of the coupler circuits 56 are configured to combine the RF signals received from the corresponding antenna elements and output a signal that has a phase difference of, for example, 90°. Reflections from signal mismatches may be provided to the ground plane via an isolation port of the coupler circuits 56.

The coupler circuits 56 are configured to provide the signals to the switching circuit 60 via the input filter circuits 58, which may be configured to reject unwanted signals from out-of-band frequency ranges associated with the antennas 43, 52. In one embodiment, the input filter circuits 58 may be implemented by one or more decoupling capacitors. In one embodiment, the coupler circuits 56 receive an input signal from each antenna element, phase shift the input signals by multiples of 360°/n, where n is the number of elements and additively combine the corresponding resultant radio frequency signals into a single output signals, which are provided to the input filter circuits 58.

In response to receiving the signals from each of the coupler circuits 56, the switching circuit 60 is configured to selectively output one of the signals. As an example, in response to providing a control signal ($V_{CTRL}$) to a first control port of the switching circuit 60, the switching circuit 60 is configured to output the signal associated with antenna 52-1 to the control module 20. In response to providing the control signal to a second control port of the switching circuit 60, the switching circuit 60 is configured to output the signal associated with antenna 52-2 to the control module 20. Likewise, in response to providing the control signal to both the first and second control ports of the switching circuit 60, the switching circuit 60 is configured to output the signal associated with antenna 52-3 to the control module 20. In order to provide the control signals to the control ports of the switching circuit 60, a 2:3 transistor-transistor logic/complementary metal-oxide-semiconductor (2:3 TTL/CMOS) compatible decoder of the switching circuit 60 is configured to selectively activate two control ports of the switching circuit 60 that may be electrically coupled to a control voltage generator circuit. The transceiver 21 may be a superheterodyne style receiver. The microprocessor configures the transceiver 21 and switches, such that the antennas 43, 52 receive a RF signal that is close to the phase lock loop (PLL), e.g., PLL+250 KHz In response to the control module 20 receiving one of the signals and sends the signal through an amplifier, a 0 degree (in-phase (I)) and 90 degree (quadrature-phase (Q)) mixer, a low pass filter, an in-phase and quadrature-phase analog-to-digital (ADC), and processing circuitry to down convert the intermediate frequency signal to a 0 Hz signal, where the processor receives IQ values of a +250 KHz sine wave.

The control module 20 is configured to determine a phase angle of the 0 Hz IF IQ signals the respective one of the antennas 43, 52 and at least one phase angle difference between the 0 Hz IF IQ signals of at least one pair of the antenna system. The phase angle refers to an angle between in-phase and quadrature-phase components of one of the signals received by the respective one of the antennas 43, 52 in the antenna system.

In order to determine the phase angle of the 0 Hz IF IQ signals and the at least one phase angle difference, the control module 20 may include one or more processors that are configured to execute instructions in a non-transitory computer readable memory, such as a RAM and/or ROM. Moreover, the control module 20 may be configured to determine the angle of arrival based on the at least one phase difference. The coupler circuits 56, the input filter circuits 58, and the switching circuit 60 may be disposed on the PCB.

The electronics system 4 generates the control signals ($V_{CTRL}$) using a corresponding circuit topology and includes a microcontroller 80 that is configured to determine a phase angle of the 0 Hz IF IQ signals of the respective one of the antennas 43, 52 and at least one phase angle difference of the antenna system. In order to determine the phase angle of the 0 Hz IF IQ signals and the at least one phase angle difference, the microcontroller 80 may include one or more processors that are configured to execute instructions in a non-transitory computer readable memory, such as RAM and/or ROM. The instructions may include, for example, algorithms for converting the signals received from the switching circuit 60 (RF FEED) into a phase angle of the 0 Hz IF IQ signals and subsequently determining the at least one phase angle difference.

The electronics system 4 may also be configured to convert power received from a power source (e.g., a DC power source that outputs 12V) to a voltage level suitable for the microcontroller 80. In one embodiment, a protection circuit 250 receives power from the power source, and the protection circuit 250 is configured to suppress high frequency signals and noise. As an example, the protection circuit 250 may include a ferrite bead and bypass capacitor filter circuit.

A voltage regulator 260 receives a filtered power signal ($V_P$), which has a voltage value that is equal to the voltage value of the power supply, from the protection circuit 250. The voltage regulator 260 converts the filtered power signal to a second logic signal ($V_{LOGIC}$) having a voltage value suitable for the microcontroller 80, such as 3.3 Volts. The voltage regulator 260 may be implemented by, for example, a voltage regulator IC or a buck converter circuit.

A LIN bus transceiver 280 may be configured to receive phase angle measurements from the microcontroller 80 and transmit them to the control module 20 via the LIN bus and choke and capacitor network 290. Additionally or alternatively, the LIN bus transceiver 280 may be configured to receive the at least one phase angle difference or at least one angle of arrival measurement(s) from the microcontroller 80 and transmit them to the control module 20 via the LIN bus and the choke and capacitor network 290. As an example, the choke and capacitor network 290 may include at least one ferrite bead and bypass capacitor filter and a Zener diode electrically coupled in parallel to the at least one ferrite bead and bypass capacitor filters. Additionally, the LIN bus transceiver 280 receives the filtered power signal from the protection circuit 250, and the LIN bus transceiver 280 may include a voltage regulator IC that converts the filtered power signal to the second logic signal ($V_{LOGIC}$).

A choke network 300 and an electromagnetic interference (EMI) filter circuit 310 are configured to suppress noise present in signals received from and/or transmitted to the microcontroller 80. The choke network 300 may be implemented by, for example, a plurality of ferrite beads. The EMI filter circuit 310 may be implemented by, for example, an integrated circuit that includes an EMI filter array.

A debug circuit 320 is configured to enable an operator to test the functionality of the various circuits of the PCB, such as the microcontroller 80. Additionally, the operator may update and/or load software of the microcontroller 80 via the debug circuit 320. The debug circuit 320 may include various interfaces for enabling the operator to test the functionality or update the software of the microcontroller 80, such as a joint test action group (JTAG) standard interface or a serial wire debug (SWD) standard interface.

The microcontroller 80 may be configured to receive the logic signal ($V_{LOGIC}$) at various ports of the microcontroller 80 via at least one capacitor network 330, which may be configured to prevent noise of the logic signal from damaging the microcontroller 80.

In some embodiments, the microcontroller 80 may include a Bluetooth transceiver circuit that enables the microcontroller 80 to communicate with peripheral devices via a Bluetooth communication link.

The microcontroller 80 may be configured to provide control signals to the switching circuit 60 via EMI filter circuit 340, which may be implemented by, for example, an integrated circuit that includes an EMI filter array. In response to receiving one of the control signals, the switching circuit 60 is configured to selectively output one of the signals received via the coupler circuits 56, as described above. As an example, in response to a first control signal being provided to the switching circuit 60, the switching circuit 60 is configured to output the signal associated with antenna 52-1 to the microcontroller 80. In response to a second control signal being provided to the switching circuit 60, the switching circuit 60 is configured to output the signal associated with antenna 52-2 to the microcontroller 80. Likewise, in response to a third control signal being provided to the switching circuit 60, the switching circuit 60 the switching circuit 60 is configured to output the signal associated with antenna 52-3 to the microcontroller 80.

In response to the microcontroller 80 receiving one of the signals, the microcontroller 80 is configured to determine a phase angle of the 0 Hz IF IQ signals of the corresponding antenna 43, 52 and at least one phase angle difference of the antenna system. Moreover, the microcontroller 80 may be configured to determine the angle of arrival based on the at least one phase difference.

Figure 6:
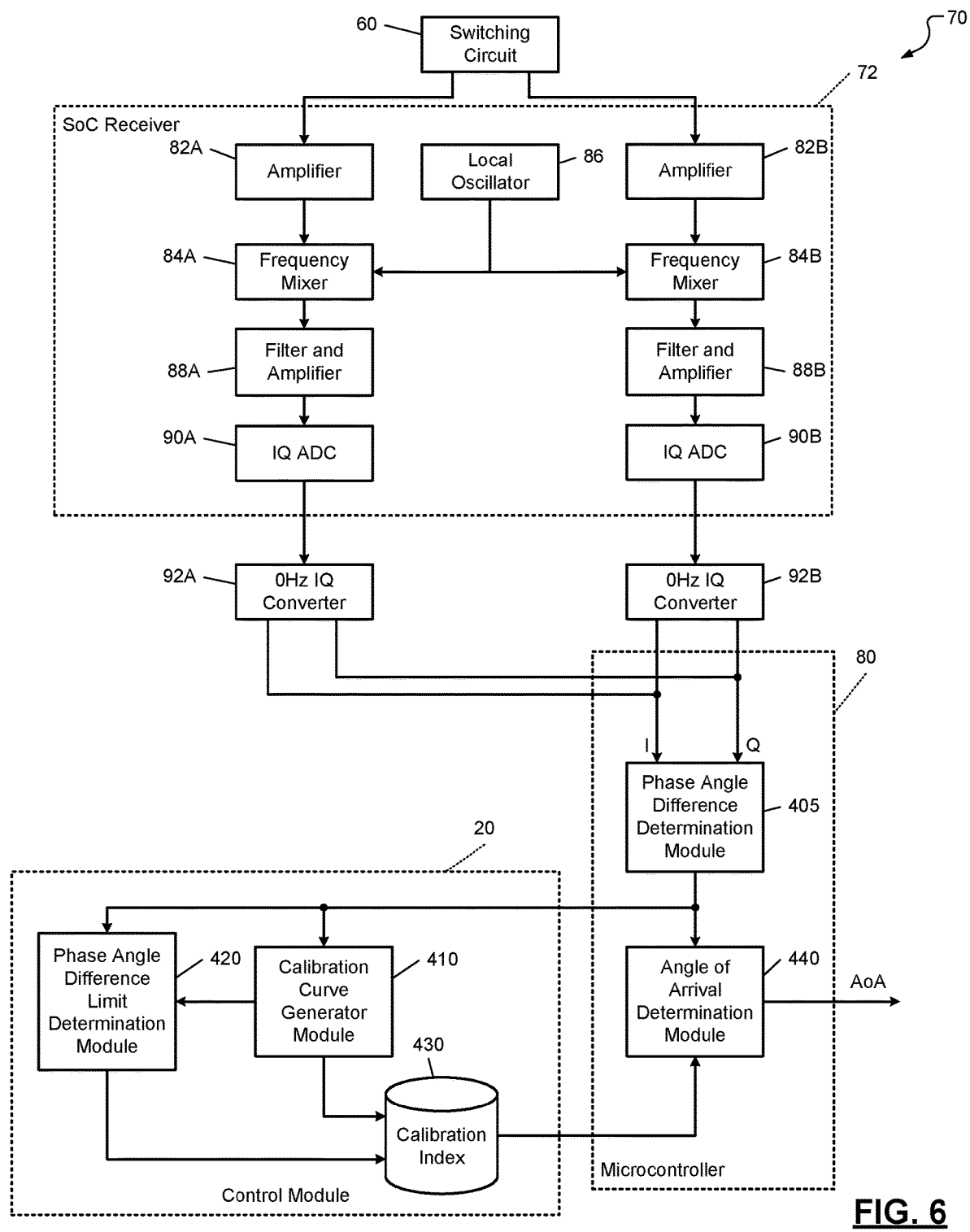
FIG. 6 illustrates an example microcontroller of an antenna system according to the present disclosure.

With reference to FIG. 6, an example functional block diagram of antenna transceiver system 70 including the switching circuit 60, a system on chip (SoC) receiver 72 and the microcontroller 80 is shown. As described below in further detail, the microcontroller 80 is configured to determine an angle of arrival of the antenna system based on one of the signals selectively outputted by the switching circuit 60. In one embodiment, the SoC receiver 72 may include one or more receive paths, where each receive path has a respective amplifier 82, frequency mixer 84, filter and amplifier 88, and in-phase quadrature-phase analog-to-digital converter 90. In the example shown, the two receives paths are provided for two antenna outputs of the switching circuit 60. The switching circuit 60 may have nay number of antenna outputs. Each antenna output may be associated with one of the antennas 52 of FIG. 5A and/or one or more of the antenna elements 70, 72, 74, 76. A 0 Hz intermediate frequency (IF) converter 92 is connected between each receive path and the microcontroller 80. The IF converter 92 may be implemented in the SoC receiver 72, the microcontroller 80 or may be separate as shown. The microcontroller 80 may include a phase difference determination module 405 and a calibration curve generator module 410. The control module 20 of FIG. 2 or the processor 37 may include a phase angle difference limit determination module 420, a calibration index 430, and an angle of arrival determination module 440. In one embodiment, the phase angle difference limit determination module 420, the calibration index 430, and the angle of arrival determination module 440 are implemented by the microcontroller 80.

The IQ ADC 90, the 0 Hz IF converter 92, the phase difference determination module 405, the calibration curve generator module 410, the phase angle difference limit determination module 420, and the angle of arrival determination module 440 may be implemented by one or more processors that are configured to execute instructions stored in a non-transitory computer readable medium, such as a RAM and/or ROM.

The amplifier 82 is configured to amplify the signals and may be implemented by, for example, an operational amplifier. The frequency mixer 84 is configured to receive the amplified signal from the amplifier 82 and a mixing signal from the local oscillator 86 in order to change the amplified signal into a new, intermediate signal. The filter and amplifier 88 may be configured to generate an analytic signal by amplifying the intermediate signal and limiting the frequencies of the intermediate signal to a certain bandwidth. In one embodiment, the filter and amplifier 88 are implemented by an operational amplifier and either a bandpass filter or a low pass filter. In another embodiment, the filter and amplifier 88 pass an intermediate frequency or set of frequencies when implemented as a bandpass filter. The filter and amplifier 88 may pass a low frequency or set of frequencies when implemented as a low pass filter.

As an example, the frequency mixer 84 receives the amplified signal, which has a frequency of, for example, 2.4 GHz-2.4835 GHz. The frequency mixer 84 receives the mixing signal from the local oscillator 86, which may be implemented by a phase-locked loop circuit, and mixes the amplified signal and the mixing signal in order to generate the intermediate signal. Subsequently, the filter and amplifier 88 may generate the analytic signal by amplifying the intermediate signal and limiting the frequencies of the intermediate signal to a certain bandwidth, such as 250 kHz.

The IQ ADC 90 is configured to convert the intermediate signal from an analog signal to a digital analytic signal. The 0 Hz IF converter 92 is configured to obtain a cosine component (i.e., in-phase component) and a sine component (i.e., quadrature-phase component) of the digital analytic signal. Subsequently, a phase angle difference determination module 405 is configured to determine a phase angle of the 0 Hz IF IQ signals of an antenna 43, 52 based on the cosine component (I or in-phase component) and the sine component (Q or quadrature-phase component). As a specific example, the phase angle difference determination module 405 may determine the phase angle by executing an arctangent function of an amplitude of the sine component and an amplitude of the cosine component. Furthermore, the phase angle difference determination module 405 may be configured to determine the phase angle difference between a pair of antennas of the antenna system based on the phase angle of each antenna of the pair of antennas. As a more specific example, the IQ converter 92 is configured to obtain a cosine component and sine component of digital data representing a constant portion of the BLE packet, such as an access address portion, preamble portion, a cyclical redundancy check portion, or a portion of the protocol data unit. The constant portion may be a pre-known portion of the packet that is known prior to receiving the packet. The BLE packet is described below in further detail with reference to FIGS. 7A-7B. Additionally, the IQ converter 92 may be configured to obtain the cosine and sine components for a predefined sampling period, which may be associated with a switching rate of the switching circuit 60. In one embodiment, the sampling period may be 4 μs.

The phase difference determination module 405 is configured to determine the phase angle difference value between a pair of antennas of the antenna system (e.g., the phase angle difference value between an outer pair of antennas, such as antennas 52-1 and 52-3) for various locations of the portable device 10. As an example, the phase angle difference determination module 405 is configured to determine the phase angle difference between the pair of antennas for each azimuth angle (i.e., 0°-360°) between the antenna system and the portable device 10.

Additionally, the phase angle difference determination module 405 is configured to determine the phase angle difference value between a pair of antennas of the antenna system for various communication channels of the portable device 10. As an example, the phase angle difference determination module 405 is configured to determine the phase angle difference between the pair of antennas for each BLE communication channel.

The calibration curve generator module 410 is configured to generate a plurality of reference curves based on the information obtained by the phase difference determination module 405. As an example, the calibration curve generator 410 may be configured to generate a first reference curve associated with a first BLE communication channel, and the first reference curve may represent a measured phase angle difference of a pair of antennas for each azimuth angle. Moreover, the calibration curve generator 410 may generate a reference curve for each BLE communication channel, wherein each of the additional reference curves represent a measured phase angle difference value of a pair of antennas for each azimuth angle. Additionally, the calibration curve generator module 410 is configured to generate a calibration curve based on the first reference curve and at least one of the additional reference curves.

The phase difference limit determination module 420 is configured to generate a phase angle difference limit for each communication channel. As an example, the phase angle difference limits may be associated with a predefined distance from the bore sight of the antenna system (e.g., phase angle difference value limits for a particular communication channel are defined as phase angle difference value on calibration curve at ±80° from bore sight). As another example, the phase angle difference limits may be determined based on the geometry of the reference curve for a particular communication channel. More specifically, the phase angle difference limits may be associated with a location on the reference curve in which the derivative of the reference curve changes by a predefined amount. The phase angle difference limit may be the same for each communication channel. In other embodiments, each communication channel may have different phase angle difference limits.

The calibration curve generator module 410 and the phase angle difference limit determination module 420 are configured to store the calibrated curve and the phase angle difference limits, respectively, in the calibration index 430. Using the calibration index 430 and the antenna pair phase angle differences, the angle of arrival determination module 440 is configured to determine the location of the portable device 10 by referencing the calibration curve and/or the phase angle difference limit of the respective channel. Using the phase angle difference and the communication channel, the respective angle of arrival determination modules 440 may reference the calibration curve and/or the phase angle difference limit associated with the first communication channel and determine the azimuth angle between the portable device 10 and the respective antenna 43. Using each of the azimuth angles obtained by each of the antennas 43, the control module 20 may be configured to determine the location of the portable device 10 relative to the vehicle 30.

Based on the phase angle difference between at least one pair of antennas 52, the angle of arrival determination module 96 is configured to determine the angle of arrival (AoA) of the wireless signal. Using AoA measurements obtained by multiple antenna systems 43, the control module 20 is configured to determine the location of the portable device 10 relative to the vehicle 30.

Figure 7B:
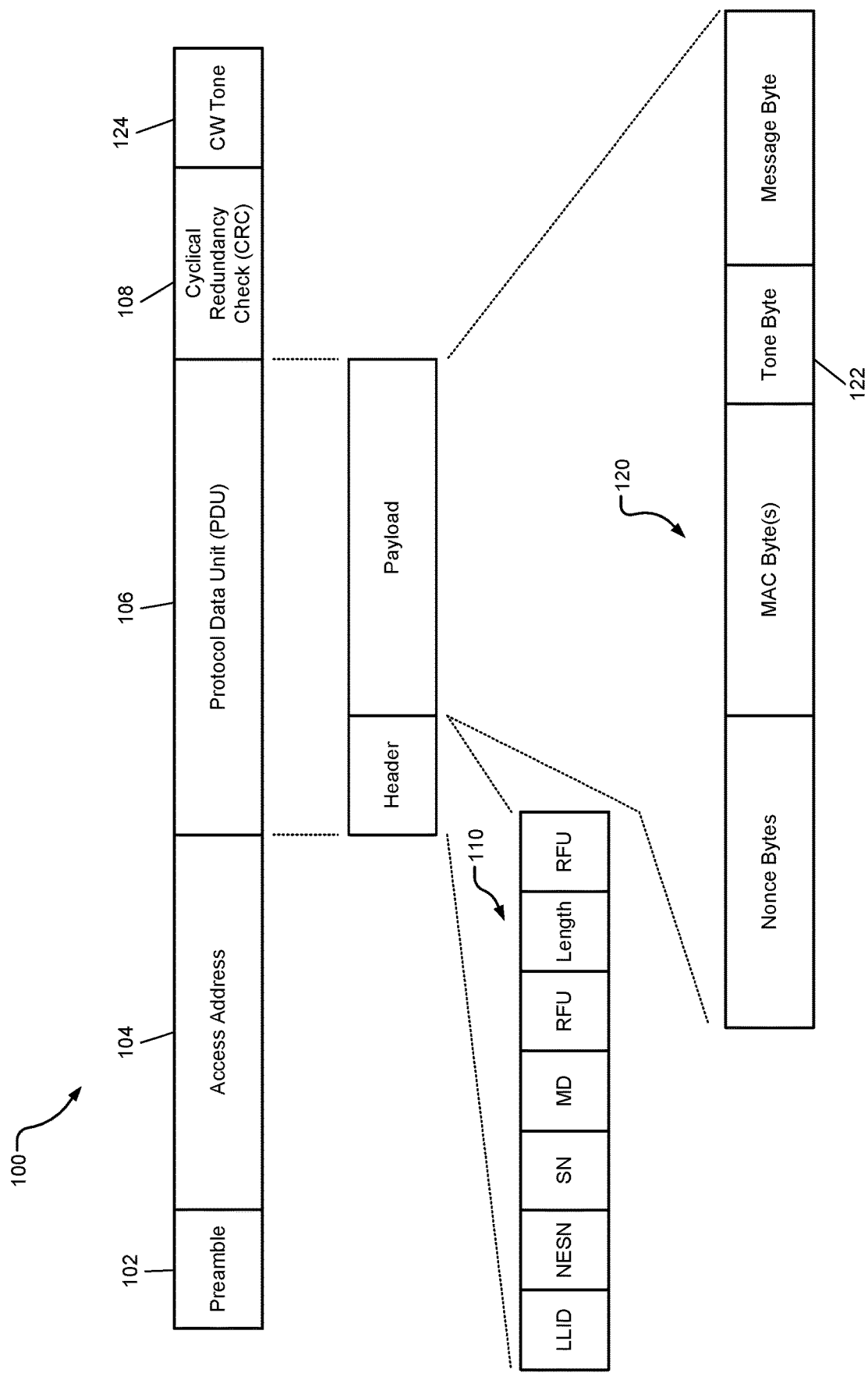

With reference to FIGS. 7A-7B, example illustrations of a message packet 100 are shown. In some embodiments, the message packet 100 may include a preamble portion 102, an access address portion 104, a protocol data unit portion (PDU) 106, and a cyclical redundancy check portion (CRC) 108. The PDU 106 may include a header portion 110, which includes logical link identifier (LLID) bits, a next expected sequence number (NESN) bit, a sequence number (SN) bit, a more data (MD) bit, length bits, and bits that are reserved for future use (RFU). The LLID bits may indicate whether the message packet 100 includes data or control messages. The NESN and SN bits may represent a sequence number for acknowledgment and flow control. The MD bit may indicate whether the portable device 10 intends to send additional message packets 100 while the portable device 10 and the communication gateway 29 communicate via communication link 50. The length bits may represent the length of a payload 120 of the PDU 106.

In one embodiment, a tone byte 122 and/or a continuous wave (CW) tone 124 may be randomly inserted at various locations of the payload 120. As an example and as shown in FIG. 7A, the tone byte 122 may be located between the CW tone 124 (e.g., a CW tone of Gaussian frequency shift keying values that each have a binary value of 1) and nonce bytes. In other embodiments, the tone byte 122 and/or CW tone 124 may be located at any other location of the payload 120.

As another example and as shown in FIG. 7B, the CW tone 124 may be located outside of the PDU 106 and after the CRC 108. In other embodiments, the CW tone 124 may be located before the preamble portion 102; between the preamble portion 102 and the access address portion 104; between the access address portion 104 and the PDU 106; or between the PDU 106 and the CRC 108.

Figure 8:
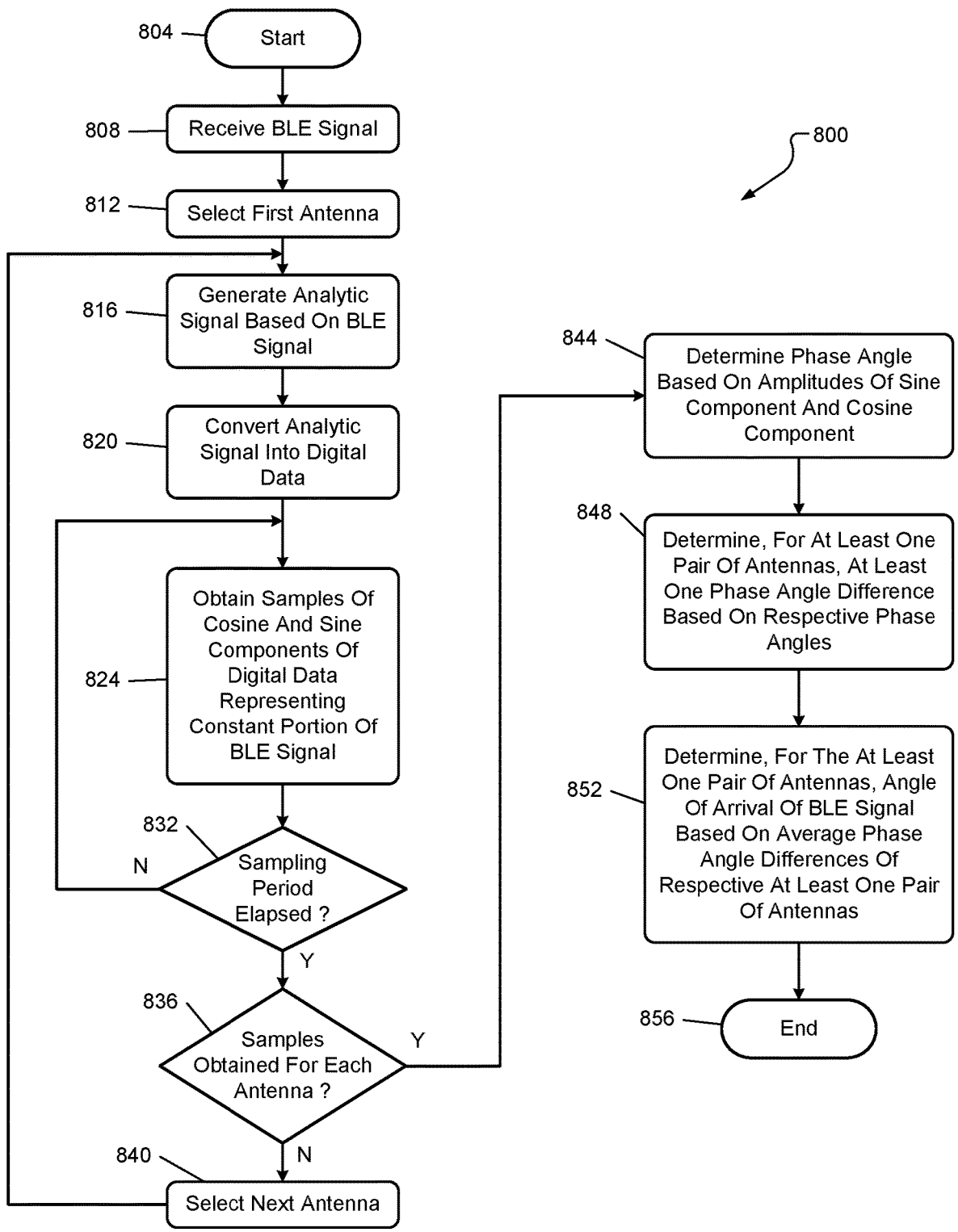
FIG. 8 illustrates a flowchart of an example control algorithm according to the present disclosure.

With reference to FIG. 8, a flowchart of a control algorithm 800 for calculating an angle of arrival of a message packet 100 is shown. The control algorithm 800 begins at 804 when, for example, the portable device 10 is connected to and authorized to connect to the communication gateway 29. As an example, the portable device 10 may be authorized to connect to the communication gateway 29 in response to the link authentication module 22 successfully executing the challenge-response authentication. At 808, the control algorithm 800 receives, using the antenna system 43, the BLE signal. At 812, the control algorithm 800 selects, using the switching circuit 60, a first antenna 52 of the antenna system 43.

In some embodiments, the corresponding antenna transceiver system 70 includes switching circuits 60 with antenna outputs and a radio receiver with multiple amplifiers, intermediate frequency filters and amplifiers, IQ ADCs, and IQ converters allowing reception of multiple IQ streams from multiple antennas simultaneously, each referenced to the same local oscillator. This allows the phase angles of simultaneous IQ samples from different antennas to be subtracted creating differences that represent the difference in time of arrival. Although a single microcontroller 80 is shown, an microcontroller 80 may be implemented for each receive path.

At 816, the control algorithm 800 generates, using the microcontroller 80, the analytic signal based on the BLE signal that includes the tone byte (122) or CW tone (124). At 820, the control algorithm 800 converts, using the ADC 90, the analytic signal into digital data representative of the BLE signal. At 824 the control algorithm 800 obtains, using the microcontroller 80, cosine components and sine components of the digital data representative of a constant and/or pre-known portion of the BLE signal (e.g., the access address portion 104) the analytic signal. At 832, the control algorithm 800 determines, using the microcontroller 80, whether a sampling period has elapsed. If so, the control algorithm 800 proceeds to 836; otherwise, the control algorithm 800 proceeds to 824.

At 836, the control algorithm 800 determines, using the microcontroller 80, whether amplitude samples were obtained for each antenna 52 of the antenna system 43. If so, the control algorithm 800 proceeds to 844; otherwise, the control algorithm 800 proceeds to 840, where the control algorithm 800 selects the next antenna 52 of the antenna system 43 and then proceeds to 816. At 844, the control algorithm 800 determines, using the microcontroller 80, a phase angle based on amplitudes of sine component and amplitudes of corresponding cosine component. As an example, the microcontroller 80 may determine the phase angle by executing an arctangent function of the amplitude of a sine component and a corresponding amplitude of the cosine component.

At 848, the control algorithm 800 determines, for at least one pair of antennas of the antenna system 43 and using the microcontroller 80 or the control module 20, at least one phase angle difference based on the respective phase angles. As an example, during the sampling period and for the first antenna 52-1, the microcontroller 80 may obtain a set of samples (e.g., eight samples or other predetermined number of samples) of an amplitude of the sine component and a set of samples (e.g., eight samples or other predetermined number of samples) of an amplitude of the cosine component, and using these samples, the phase angle difference determination module 94 may determine eight phase angles, as described above. Subsequently, the microcontroller 80 repeats these steps in order to obtain eight phase angles for the second antenna 52-2 and/or the third antenna 52-3, and eight additional phase angles for the first antenna 52-1. Based on the differences between corresponding phase angle samples of a pair of antennas 52 (i.e., a first sample of the first iteration of phase angles of antenna 52-1, a first sample of the first iteration of phase angles of antenna 52-2 or antenna 52-3, and a first sample of the second iteration of phase angles of antenna 52-1), a distance separating the respective pair of antennas 52, and/or a number of samples obtained during each iteration, the phase angle difference determination module 94 may determine the phase angle difference between the respective pair of antennas. In some embodiments, the phase angle difference determination module 94 may perform a phase unwrapping algorithm in order to improve the accuracy of the phase angle difference determination.

Additionally at 848, when the analytic signal based on the BLE signal is transmitted a Gaussian Frequency Shift Keyed series of constant (identical) "1" or "0" symbols that create a constant tone, it is clear that all frequency shifts which are also phase shifts that are captured as phase angle differences may be attributed as being caused primarily by the antenna selection and the different time of arrival of a phase at an antenna due to the geometry of the antennas and the transmitter and with a constant residual frequency at 92A or 92B. The constant residual frequency is received if the antennas had not been switched. This is the difference in instantaneous frequency between the carrier frequency generated by 86 and 84A or 84B and the frequency of the Gaussian Frequency Shift Keyed constant symbols that compose the constant transmitted tone. This is a predicted residual frequency sequence without antenna switching. When 848 calculates the phase difference it subtracts out the predicted residual frequency sequence (also called residual phase variation) based upon the time when the IQ samples are taken.

Additionally at 848, when the analytic signal based on the BLE signal is a pre-known portion based upon a pre-known tone byte or bytes containing a pre-known sequence including Gaussian Frequency Shift Keyed "1" or "0" signals that create a Gaussian Frequency Shift Keyed varying analytic signal, the residual signal has a varying residual frequency (also called residual phase variation) that is pre-known at 92A or 92B. The residual signal is received if the antennas had not been switched. This is the difference in instantaneous frequency between the carrier and the varying analytic signal. Again, this is a predicted residual frequency sequence without antenna switching. Again, when 848 calculates the phase difference it subtracts out the predicted residual frequency sequence (also called residual phase variation) based upon the time when the IQ samples are taken.

Because of part to part, frequency to frequency, temperature to temperature, and voltage to voltage variation in the transmission and reception of analytic signals with a varying residual frequency. The control algorithm may record the IQ samples at 92A or 92B of the 1 to 0 and 0 to 1 transitions of the analytic signal at a given a frequency and temperature without switching the antennas and use those to construct a predicted residual frequency sequence without antenna switches. Again, when 848 calculates the phase difference it subtracts out the residual frequency (also called residual phase variation) based upon the time when the IQ samples are taken.

At 852, the control algorithm 800 determines, for the at least one pair of antennas 52 of the antenna system 43 and using the microcontroller 80 and the phase angle differences from step 848 and the distance separating the respective pair of antennas 52, an angle of arrival of the BLE signal based on an average phase angle difference of the phase angle differences of the respective at least one pair of antennas. At 856, the control algorithm 800 ends.

Additionally, the control algorithm 800 may determine a location of the portable device 10 and/or distance between the portable device 10 and the vehicle 30 based on angle of arrivals obtained by at least one of the antenna systems 43 of the respective sensors 31. As an example, the control algorithm 800 may determine that the portable device 10 is located at an intersection of a first line representative of the angle of arrival at a first sensor 31A and a second line representative of the angle of arrival at a second sensor 31B.

The control algorithm 800 may determine, using the microcontroller 80, an angle of arrival of the portable device 10 based on (i) the determined phase angle difference and (ii) the calibration curve or corresponding phase angle difference limits. As an example, the microcontroller 80 may determine the angle of arrival by identifying an azimuth angle on the calibration curve that is associated with the determined phase angle difference. Alternatively, the microcontroller 80 may determine the angle of arrival by identifying an azimuth angle on the calibration curve associated with the phase angle difference limits that is associated with the determined phase angle difference and the communication channel of the communication link 50. The angle of arrival is based on, equal to and/or directly related to the azimuth angles determined. The control algorithm 800 may determine, using the control module 20, the location of the portable device 10 relative to the vehicle 30 based on each of the angle of arrivals obtained by the sensors 31.

The control module 20 may, based on or in response to determined location of the portable device 10, unlock a vehicle door, provide access to a vehicle (e.g., the vehicle 30), open a window, permit starting of a vehicle, and/or perform some other task.

In accordance with the present teachings, a method includes receiving, using a plurality of antennas, a wireless signal comprising a packet, wherein the packet includes data with a pre-known portion. The method also includes generating, using at least one of a transceiver or a microcontroller, (i) a first set of digital data that is representative of the pre-known portion received using a first antenna of the plurality of antennas, and (ii) a second set of digital data that is representative of the pre-known portion received using a second antenna of the plurality of antennas. The method also includes obtaining, using the microcontroller, (i) a first sample that is representative of a cosine component of the pre-known portion of the first set of digital data, and (ii) a second sample that is representative of a sine component of the pre-known portion of the first set of digital data. The method also includes obtaining, using the microcontroller, (i) a third sample that is representative of a cosine component of the pre-known portion of the second set of digital data, and (ii) a fourth sample that is representative of a sine component of the pre-known portion of the second set of digital data. The method also includes determining, using a processor of the microcontroller, (i) a first phase angle value associated with the first antenna based on an amplitude of the first sample and an amplitude of the second sample, and (ii) a second phase angle value associated with the second antenna based on an amplitude of the third sample and an amplitude of the fourth sample, wherein the processor is configured to execute instructions stored in a non-transitory computer-readable memory. The method also includes determining, using the processor, an angle of arrival based on a difference between the first phase angle value and the second phase angle value.

In other features, the wireless signal is a Bluetooth signal.

In other features, the pre-known portion of the first set of digital data is an access address portion of the Bluetooth signal and the pre-known portion of the second set of digital data is the access address portion of the Bluetooth signal.

In other features, the pre-known portion of the first set of digital data is one of a preamble portion and a cyclical redundancy check portion of the Bluetooth signal and the pre-known portion of the second set of digital data is one of the preamble portion and the cyclical redundancy check portion of the Bluetooth signal.

In other features, the Bluetooth signal includes a preamble portion, an access address portion, a protocol data unit portion, and a cyclical redundancy check portion.

In other features, the Bluetooth signal includes a constant waveform (CW) tone section.

In other features, the method includes obtaining the first sample, the second sample, the third sample, and the fourth sample using an IQ generator of the microcontroller.

In other features, the method includes coupling, using a switching circuit, the first antenna to the microcontroller, and, in response to a sampling period elapsing, decoupling, using the switching circuit, the first antenna from the microcontroller, and coupling, using the switching circuit, the second antenna to the microcontroller.

In other features, the method includes determining the first phase angle value further comprises executing, using the processor, an arctangent function based on the amplitude of the first sample and the amplitude of the second sample.

In other features, the method includes determining the second phase angle value further comprises executing, using the processor, an arctangent function based on the amplitude of the third sample and the amplitude of the fourth sample.

In other features, the generating includes using multiple receive paths and one or more microcontrollers simultaneously to receive (i) the first set of digital data that is representative of the pre-known portion received using the first antenna of the plurality of antennas, and (ii) the second set of digital data that is representative of the pre-known portion received using the second antenna of the plurality of antennas.

In accordance with the present teachings, a system includes a plurality of antennas configured to receive a wireless signal comprising a packet, wherein the packet includes data with a pre-known portion. The system further includes a transceiver configured to generate (i) a first set of digital data that is representative of the pre-known portion received using a first antenna of the plurality of antennas, and (ii) a second set of digital data that is representative of the pre-known portion received using a second antenna of the plurality of antennas. The system further includes a microcontroller configured to obtain (i) a first sample that is representative of a cosine component of the pre-known portion of the first set of digital data, and (ii) a second sample that is representative of a sine component of the pre-known portion of the first set of digital data, and obtain (i) a third sample that is representative of a cosine component of the pre-known portion of the second set of digital data, and (ii) a fourth sample that is representative of a sine component of the pre-known portion of the second set of digital data. The microcontroller includes a processor configured to execute instructions stored in a non-transitory computer-readable memory, and wherein the instructions include determining (i) a first phase angle value associated with the first antenna based on an amplitude of the first sample and an amplitude of the second sample, and (ii) a second phase angle value associated with the second antenna based on an amplitude of the third sample and an amplitude of the fourth sample, and determining an angle of arrival based on a difference between the first phase angle value and the second phase angle value.

In other features, the wireless signal is a Bluetooth signal.

In other features, the pre-known portion of the first set of digital data is an access address portion of the Bluetooth signal, and the pre-known portion of the second set of digital data is the access address portion of the Bluetooth signal.

In other features, the pre-known portion of the first set of digital data is one of a preamble portion and a cyclical redundancy check portion of the Bluetooth signal and the pre-known portion of the second set of digital data is one of the preamble portion and the cyclical redundancy check portion of the Bluetooth signal.

In other features, the Bluetooth signal includes a preamble portion, an access address portion, a protocol data unit portion, and a cyclical redundancy check portion.

In other features, the Bluetooth signal includes a constant waveform (CW) tone section.

In other features, the system further includes an IQ generator of the microcontroller, wherein the IQ generator is configured to obtain the first sample, the second sample, the third sample, and the fourth sample.

In other features, the system further includes a switching circuit configured to couple the first antenna to the microcontroller, and, in response to a sampling period elapsing, decouple the first antenna from the microcontroller, and couple the second antenna to the microcontroller.

In other features, the processor is configured to determine the first phase angle value by executing an arctangent function based on the amplitude of the first sample and the amplitude of the second sample.

In other features, the processor is configured to determine the first phase angle value by executing an arctangent function based on the amplitude of the third sample and the amplitude of the fourth sample.

In other features, the generating includes using multiple receive paths and one or more microcontrollers simultaneously to receive (i) the first set of digital data that is representative of the pre-known portion received using the first antenna of the plurality of antennas, and (ii) the second set of digital data that is representative of the pre-known portion received using the second antenna of the plurality of antennas.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C #, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A method comprising:
receiving, using a plurality of antennas, a wireless signal comprising a packet, wherein the packet includes data with a pre-known portion, and wherein the pre-known portion of the packet is known prior to receiving the packet;
generating, using at least one of a transceiver or a microcontroller, (i) a first set of digital data that is representative of the pre-known portion received using a first antenna of the plurality of antennas, and (ii) a second set of digital data that is representative of the pre-known portion received using a second antenna of the plurality of antennas;
obtaining, using the microcontroller, (i) a first sample that is representative of a cosine component of the pre-known portion of the first set of digital data, and (ii) a second sample that is representative of a sine component of the pre-known portion of the first set of digital data;
obtaining, using the microcontroller, (i) a third sample that is representative of a cosine component of the pre-known portion of the second set of digital data, and (ii) a fourth sample that is representative of a sine component of the pre-known portion of the second set of digital data;
determining, using a processor of the microcontroller, (i) a first phase angle value associated with the first antenna based on an amplitude of the first sample and an amplitude of the second sample, and (ii) a second phase angle value associated with the second antenna based on an amplitude of the third sample and an amplitude of the fourth sample, wherein the processor is configured to execute instructions stored in a non-transitory computer-readable memory; and
determining, using the processor, an angle of arrival based on a difference between the first phase angle value and the second phase angle value.

2. The method of claim 1, wherein the wireless signal is a Bluetooth signal.

3. The method of claim 2, wherein:
the pre-known portion of the first set of digital data is an access address portion of the Bluetooth signal; and
the pre-known portion of the second set of digital data is the access address portion of the Bluetooth signal.

4. The method of claim 2, wherein:
the pre-known portion of the first set of digital data is one of a preamble portion and a cyclical redundancy check portion of the Bluetooth signal; and
the pre-known portion of the second set of digital data is one of the preamble portion and the cyclical redundancy check portion of the Bluetooth signal.

5. The method of claim 2, wherein the Bluetooth signal includes a preamble portion, an access address portion, a protocol data unit portion, and a cyclical redundancy check portion.

6. The method of claim 5, wherein the Bluetooth signal includes a constant waveform (CW) tone section.

7. The method of claim 1 further comprising obtaining the first sample, the second sample, the third sample, and the fourth sample using an IQ generator of the microcontroller.

8. The method of claim 1 further comprising:
coupling, using a switching circuit, the first antenna to the microcontroller; and
in response to a sampling period elapsing
decoupling, using the switching circuit, the first antenna from the microcontroller, and
coupling, using the switching circuit, the second antenna to the microcontroller.

9. The method of claim 1, wherein determining the first phase angle value further comprises executing, using the processor, an arctangent function based on the amplitude of the first sample and the amplitude of the second sample.

10. The method of claim 1, wherein determining the second phase angle value further comprises executing, using the processor, an arctangent function based on the amplitude of the third sample and the amplitude of the fourth sample.

11. The method of claim 1, wherein the generating includes using multiple receive paths and one or more microcontrollers simultaneously to receive (i) the first set of digital data that is representative of the pre-known portion received using the first antenna of the plurality of antennas, and (ii) the second set of digital data that is representative of the pre-known portion received using the second antenna of the plurality of antennas.

12. A system comprising:
a plurality of antennas configured to receive a wireless signal comprising a packet, wherein the packet includes data with a pre-known portion, and wherein the pre-known portion of the packet is known prior to receiving the packet;
a transceiver configured to generate (i) a first set of digital data that is representative of the pre-known portion received using a first antenna of the plurality of antennas, and (ii) a second set of digital data that is representative of the pre-known portion received using a second antenna of the plurality of antennas; and
a microcontroller is configured to
obtain (i) a first sample that is representative of a cosine component of the pre-known portion of the first set of digital data, and (ii) a second sample that is representative of a sine component of the pre-known portion of the first set of digital data, and
obtain (i) a third sample that is representative of a cosine component of the pre-known portion of the second set of digital data, and (ii) a fourth sample that is representative of a sine component of the pre-known portion of the second set of digital data,
wherein the microcontroller includes a processor configured to execute instructions stored in a non-transitory computer-readable memory, and wherein the instructions include
determining (i) a first phase angle value associated with the first antenna based on an amplitude of the first sample and an amplitude of the second sample, and (ii) a second phase angle value associated with the second antenna based on an amplitude of the third sample and an amplitude of the fourth sample, and
determining an angle of arrival based on a difference between the first phase angle value and the second phase angle value.

13. The system of claim 12, wherein the wireless signal is a Bluetooth signal.

14. The system of claim 13, wherein:
the pre-known portion of the first set of digital data is an access address portion of the Bluetooth signal; and
the pre-known portion of the second set of digital data is the access address portion of the Bluetooth signal.

15. The system of claim 13, wherein:
the pre-known portion of the first set of digital data is one of a preamble portion and a cyclical redundancy check portion of the Bluetooth signal; and
the pre-known portion of the second set of digital data is one of the preamble portion and the cyclical redundancy check portion of the Bluetooth signal.

16. The system of claim 13, wherein the Bluetooth signal includes a preamble portion, an access address portion, a protocol data unit portion, and a cyclical redundancy check portion.

17. The system of claim 16, wherein the Bluetooth signal includes a constant waveform (CW) tone section.

18. The system of claim 12 further comprising an IQ generator of the microcontroller, wherein the IQ generator is configured to obtain the first sample, the second sample, the third sample, and the fourth sample.

19. The system of claim 12 further comprising a switching circuit configured to:
couple the first antenna to the microcontroller; and
in response to a sampling period elapsing
decouple the first antenna from the microcontroller, and
couple the second antenna to the microcontroller.

20. The system of claim 12, wherein the processor is configured to determine the first phase angle value by executing an arctangent function based on the amplitude of the first sample and the amplitude of the second sample.

21. The system of claim 12, the processor is configured to determine the first phase angle value by executing an arctangent function based on the amplitude of the third sample and the amplitude of the fourth sample.

22. The system of claim 12, wherein the generating includes using multiple receive paths and one or more microcontrollers simultaneously to receive (i) the first set of digital data that is representative of the pre-known portion received using the first antenna of the plurality of antennas, and (ii) the second set of digital data that is representative of the pre-known portion received using the second antenna of the plurality of antennas.

* * * * *